United States Patent Office 3,350,168
Patented Oct. 31, 1967

3,350,168
METHODS OF PREVENTING DECOMPOSITION OF ANHYDROUS AMMONIUM THIOSULFATE
Henry B. Ziegler, Stroudsburg, Pa., assignor to Heico, Inc., a corporation of Delaware
No Drawing. Filed Dec. 18, 1963, Ser. No. 331,373
8 Claims. (Cl. 23—115)

This invention relates to a process of preventing the decomposition of anhydrous ammonium thiosulfate. It relates more particularly to a method of preventing the decomposition of anhydrous ammonium thiosulfate by adding to the freshly prepared anhydrous ammonium thiosulfate a small quantity of an ammonium salt of an acid having a dissocation constant sufficiently small that it will provide an atmosphere of ammonia before the ammonium thiosulfate begins decomposing, e.g., an ammonium salt of a weak acid.

Ammonium thiosulfate is shipped and stored at the present time, almost exclusively in the form of a water solution. This solution as customarily manufactured contains from 57 percent to 60 percent by weight of anhydrous ammonium thiosulfate, $(NH_4)_2S_2O_3$. It is necessary to ship and store ammonium thiosulfate in water solution because anhydrous ammonium thiosulfate decomposes spontaneously, yielding decomposition products, the most objectionable of which is elemental sulfur. These decomposition products do not dissolve completely, so that anhydrous ammonium thiosulfate in which decomposition has taken place yields a murky solution which is unusable in the arts. A considerable saving in shipping and storage costs could be effected if the decomposition of anhydrous ammonium thiosulfate could be prevented. That these savings would be economically important is indicated by the fact that the annual consumption of ammonium thiosulfate in the United States is on the order of 30,000 tons. In addition, where storage space and weight is at a premium, as in military, air or naval installations, the use of anhydrous ammonium thiosulfate is obviously advantageous.

I have found that the decomposition of anhydrous ammonium thiosulfate can be prevented by adding to the freshly prepared ammonium thiosulfate a small amount of an ammonium salt of an acid having a dissociation constant sufficiently small that it will provide an atmosphere of ammonia before the ammonium thiosulfate begins decomposing. Preferably, I add a small amount of an ammonium salt of a weak acid. The ammonium salt of a weak acid is preferably added to the freshly prepared ammonium thiosulfate, still moist from the manufacturing process. It may, however, be added to the dried anhydrous ammonium thiosulfate, if decomposition of the anhydrous ammonium thiosulfate has not yet begun. Alternatively, the ammonium salt of a weak acid may be added to the mother liquor of the ammonium thiosulfate prior to crystallization, during crystallization, or after crystallization.

Among the ammonium salts of weak acids which may be used according to the present invention, the following may be mentioned:

(1) The ammonium salts of weak acids which are themselves volatile in character, as for example, ammonium carbonate.

(2) The ammonium salts of tribasic acids, whose second and third dissociation constants are less than $1 \times 10^{-5}$, as for example dibasic ammonium orthophosphate or tribasic ammonium citrate.

(3) The ammonium salts of dibasic acids, whose second dissociation constant is less than $1 \times 10^{-5}$, as for example, dibasic ammonium phthalate.

(4) The ammonium salts of any acid whose dissociation constant (or constants) is (or are) sufficiently small so that its ammonium salt decomposes to provide an atmosphere of ammonia before the ammonium thiosulfate begins to decompose.

While not wishing to be bound by any specific theory as to the mechanism of the stabilizing action of ammonium salts of weak acids, by which the decomposition of ammonium thiosulfate is prevented, it seems probable that the decomposition reaction begins by the dissociation of ammonium thiosulfate as follows:

$$(NH_4)_2S_2O_3 \rightarrow NH_3 + NH_4HS_2O_3 \qquad (1)$$

The ammonia formed by this reaction, being a gas at ordinary temperatures, escapes, leaving behind the ammonium acid thiosulfate. The ammonium acid thiosulfate in turn, decomposes as follows:

$$NH_4HS_2O_3 \rightarrow NH_4HSO_3 + S \qquad (2)$$

The sulfur formed in the above reaction gives a yellow discoloration to the ammonium thiosulfate remaining in the container. Furthermore, when the ammonium thiosulfate is now dissolved in water, it no longer gives a clear, colorless solution, but gives a murky solution due to the insolubility of the particles of sulfur.

The mechanism of the decomposition reaction is complicated, and may follow other lines than those indicated, but the sulfur which results makes the ammonium thiosulfate unacceptable in the trade and useless in the arts.

The admixture of small amounts of an ammonium salt of a weak acid prevents the decomposition of ammonium thiosulfate, probably by the action of the ammonia which is slowly released by the ammonium salt of a weak acid. For example, ammonium carbonate releases ammonia as follows:

$$(NH_4)_2CO_3 \rightarrow 2NH_2 + H_2O + CO_2 \qquad (3)$$

Since the solid particles of ammonium thiosulfate are continuously bathed in the ammonia being released by the ammonium carbonate, reaction (1) above is prevented, and the ammonium thiosulfate does not decompose.

Ammonium carbonate has the additional advantage of not forming solid products when it decomposes to yield ammonia, water and carbon dioxide (Equation 3). Nevertheless, any ammonium salt of a weak acid can be used to prevent the decomposition of ammonium thiosulfate, if the decomposition products of the ammonium salt of the weak acid are not objectionable in the ammonium thiosulfate.

The amount of ammonium salt of a weak acid which is required is in general surprisingly small, from 0.01% to 1.50% by weight having been found to be suitable, 0.2% being optimum.

The following examples will serve further to illustrate the novel aspects of the invention and are to be taken as illustrative rather than limitative.

*Example I*

Ten (10) grams of freshly prepared anhydrous ammonium thiosulfate was placed in a 300 cubic centimeter bottle and lightly stoppered. The bottle and its contents were placed in a laboratory oven maintained at 220° F. After one hour in the oven, the ammonium thiosulfate had begun to decompose, as evidenced by yellow discoloration, foul odor, and cloudy solution when dissolved.

*Example II*

Ten (10) grams of freshly prepared anhydrous ammonium thiosulfate, from the same batch as that used in Example I, was placed in a 300 cubic centimeter bottle and lightly stoppered. After being stored in the laboratory for two weeks at temperature of 68–75° F., the ammonium thiosulfate showed evidence of decomposition (as in Example I).

*Example III*

Ten (10) grams of freshly prepared anhydrous ammonium thiosulfate, from the same batch as that used in Example I, were mixed with 0.1% by weight of ammonium carbonate, placed in a 300 cubic centimeter bottle and lightly stoppered. The bottle and its contents were placed in a laboratory oven at 220° F. No evidence of decomposition appeared until eighteen hours had elapsed.

*Example IV*

Ten (10) grams of freshly prepared anhydrous ammonium thiosulfate from the same batch as that used in Example I, were mixed with 0.1% by weight of ammonium carbonate, placed in a 300 cubic centimeter bottle, lightly stoppered, and stored in the laboratory at 68–75° F. No evidence of decomposition was noted until 4 months time had elapsed.

*Example V*

Ten (10) grams of freshly prepared anhydrous ammonium thiosulfate, from the same batch as that used in Example I, were mixed with 0.2% by weight of ammonium carbonate, placed in a 300 cubic centimeter bottle and lightly stoppered. The bottle and its contents were placed in a laboratory oven at 220° F. No evidence of decomposition was noted until one hundred sixty-four hours had elapsed.

*Example VI*

Ten (10) grams of freshly prepared ammonium thiosulfate from the same batch as that used in Example I, were mixed with 0.2% by weight of ammonium carbonate, placed in a 300 cubic centimeter bottle, lightly stoppered, and stored in the laboratory at 68–75° F. No evidence of decomposition was noted after one year had elapsed.

*Example VII*

Ten (10) grams of freshly prepared anhydrous ammonium thiosulfate, from the same batch as that used in Example I, were mixed with 0.2% by weight of dibasic ammonium orthophosphate, placed in a 300 cubic centimeter bottle and lightly stoppered. The bottle and its contents were placed in a laboratory oven at 220° F. No evidence of decomposition was noted until ninety-six hours had elapsed.

*Example VIII*

Ten (10) grams of freshly prepared anhydrous ammonium thiosulfate, from the same batch as that used in Example I, were mixed with 0.2% by weight of dibasic ammonium orthophosphate, placed in a 300 cubic centimeter bottle, lightly stoppered, and stored in the laboratory at 68–75° F. No evidence of decomposition was noted until seven months had elapsed.

*Example IX*

Ten (10) grams of freshly prepared anhydrous ammonium thiosulfate, from the same batch as that used in Example I, were mixed with 0.2% by weight of tribasic ammonium citrate, placed in a 300 cubic centimeter bottle and lightly stoppered. The bottle and its contents were placed in a laboratory oven at 220° F. No evidence of decomposition was noticed until 112 hours had elapsed.

*Example X*

Ten (10) grams of freshly prepared ammonium thiosulfate, from the same batch as that used in Example I, were mixed with 0.2% by weight of tribasic ammonium citrate, placed in a 300 cubic centimeter bottle, lightly stoppered, and stored in the laboratory at 68–75° F. No evidence of decomposition was noticed until nine months had elapsed.

*Example XI*

Ten (10) grams of freshly prepared ammonium thiosulfate, from the same batch as that used in Example I, were mixed with 0.2% by weight of dibasic ammonium phthalate, placed in a 300 cubic centimeter bottle and lightly stoppered. The bottle and its contents were placed in a laboratory oven at 220° F. No evidence of decomposition was noted until 84 hours had elapsed.

*Example XII*

Ten (10) grams of freshly prepared anhydrous ammonium thiosulfate, from the same batch as that used in Example I, were mixed with 0.2% by weight of dibasic ammonium phthalate, placed in a 300 cubic centimeter bottle, lightly stoppered, and stored in the laboratory at 68–75° F. No evidence of decomposition was noticed until six months had elapsed.

The invention is not limited to the particular embodiments described, which have been given merely for illustrative purposes, but may be otherwise embodied or practiced within the scope of the following claims.

I claim:

1. The process of preventing the decomposition of anhydrous ammonium thiosulfate in a closed container, which comprises admixing with the anhydrous ammonium thiosulfate prior to the inception of decomposition a small amount of an ammonium salt of an acid whose dissociation constant is sufficiently small that it will provide an atmosphere of ammonia before any decomposition of ammonium thiosulfate occurs.

2. The process of claim 1 wherein the ammonium salt is added to the ammonium thiosulfate in an amount equal to about 0.01% to 10% by weight.

3. The process of preventing the decomposition of anhydrous ammonium thiosulfate in a closed container, which comprises admixing a small amount of an ammonium salt of a weak acid with freshly prepared ammonium thiosulfate in the proportion from 0.01% to 10% by weight.

4. The process of claim 3 wherein the weak acid is carbonic acid.

5. The process of claim 3 wherein the weak acid is orthophosphoric acid.

6. The process of claim 3 wherein the weak acid is phthalic acid.

7. The process of claim 3 wherein the weak acid is citric acid.

8. The process of claim 3 wherein the weak acid is any acid whose dissociation constant is less than that of thiosulfuric acid.

References Cited

UNITED STATES PATENTS

| | | | |
|---|---|---|---|
| Re. 20,563 | 11/1937 | Lowenstein | 23—1 X |
| 2,586,459 | 2/1952 | Farr et al. | 23—115 |

EARL C. THOMAS, *Primary Examiner.*

OSCAR R. VERTIZ, *Examiner.*

UNITED STATES PATENT OFFICE

CERTIFICATE OF CORRECTION

Patent No. 3,350,168            October 31, 1967

Henry B. Ziegler

It is hereby certified that error appears in the above numbered patent requiring correction and that the said Letters Patent should read as corrected below.

Column 1, line 15, for "dissocation" read -- dissociation --; column 2, line 35, for "$(NH_4)_2CO_3 \quad 2NH_2+H_2O+CO_2$" read -- $(NH_4)_2CO_3 \quad 2NH_3+H_2O+CO_2$ --.

Signed and sealed this 7th day of January 1969.

SEAL)
Attest:

Edward M. Fletcher, Jr.
Attesting Officer

EDWARD J. BRENNER
Commissioner of Patents